United States Patent Office 2,780,550
Patented Feb. 5, 1957

2,780,550

STABILIZATION PROCESS

William K. T. Gleim, Orland Park, Ill., assignor to Universal Oil Products Company, Des Plaines, Ill., a corporation of Delaware No Drawing. Application March 18, 1953,
Serial No. 343,241

9 Claims. (Cl. 99—163)

This invention relates to a stabilization process and more particularly to a novel method of preventing and/or retarding deterioration of unstable compounds.

Many organic compounds undergo deterioration during storage, transportation or treatment, resulting in the formation of undesirable gum, discoloration, rancidity and other deleterious products, due to oxidation, polymerization or other undesired reactions. The deterioration of the organic substance may be prevented and/or retarded by the novel method of the present invention and thus the present invention, for example, may be utilized for the stabilization of hydrocarbon distillates including motor fuel, particularly unsaturated gasolines as, for example, cracked gasoline, polymer gasoline, etc., kerosene, diesel oil, mineral oil, lubricating oil, fuel oil, drying oil, etc., fatty materials including edible fats and oils, which may be of mineral, animal or vegetable origin, foods, rubber, plastics, resins, waxes, monomers, adhesives, photographic developers, etc.

In one embodiment the present invention relates to a method of stabilizing an organic substance against oxidative deterioration which comprises adding thereto an inhibitor comprising a substituted acenaphthene in which the substituents are selected from the group consisting of diamino-, dihydroxy- and hydroxyamino-groups, the substituent groups being attached to different aryl rings.

In a specific embodiment the present invention relates to a method of stabilizing gasoline against deterioration in storage which comprises incorporating therein from about 0.0001% to about 1% by weight of 5,6-diamino-acenaphthene.

As hereinbefore set forth, the novel inhibitor of the present invention comprises a substituted acenaphthene in which the substituents comprise diamino-, dihydroxy- or aminohydroxy-groups, and in which the substituent groups are attached to different aryl rings. A preferred inhibitor comprises 5,6-diamino-acenaphthene which is illustrated by the following general formula:

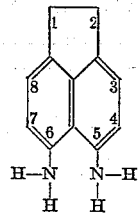

The inhibitor potency if 5,6-diamino-, 5,6-dihydroxy- or 5-amino-6-hydroxy-acenaphthenes is surprising because these substituents may be considered as being in meta relationship to each other. It is well recognized that most compounds having substituents in meta relationship to each other do not exhibit inhibitor potency. Similarly, it may be considered surprising that another preferred inhibitor in which the amino and/or hydroxy groups are substituted in the 3,7-positions exhibits inhibitor potency because it generally has been found in the past that para relationship is necessary for inhibitor potency.

Although not illustrated in the formula it is understood that the inhibitor compound may contain substituents attached thereto in any of the open positions. The substituents preferably comprise alkyl groups which may contain from one to about 12 carbon atoms per group. However, when the inhibitor compound is to be used in a high boiling substrate, larger size alkyl substituents may be included and thus may contain up to about 25 carbon atoms per group. Other hydrocarbon substituents may be employed including aryl, aralkyl, alkaryl, cycloalkyl, etc. In still other cases, the substituents may comprise groups containing oxygen, nitrogen and/or sulfur.

As hereinbefore set forth a preferred inhibitor compound comprises 5,6-diamino-acenaphthene. Another preferred inhibitor comprises 3,7-diamino-acenaphthene. Other specific compounds include 3,6-diamino-acenaphthene, 3,8-diamino-acenaphthene, 4,7-diamino-acenaphthene, 3,6-dihydroxy-acenaphthene, 3,7-dihydroxy-acenaphthene, 3,8 - dihydroxy - acenaphthene, 4,7-dihydroxy - acenaphthene, 5,6 - dihydroxy - acenaphthene, 3-amino - 6 - hydroxy-acenaphthene, 3-amino-7-hydroxy-acenaphthene, 3 - amino - 8 - hydroxy - acenaphthene, 4-amino - 7 - hydroxy-acenaphthene, 5-amino-6-hydroxy-acenaphthene, 3-hydroxy-6-amino-acenaphthene, 3-hydroxy-7-amino-acenaphthene, 3,8-dimethyl-5,6 - diamino-acenaphthene, 3,8-diethyl-5,6-diamino-acenaphthene, 3,8-dipropyl-5,6-diamino-acenaphthene, 3,8 - dibutyl-5,6-diamino - acenaphthene, 3,8 - diamyl - 5,6 - diamino - acenaphthene, 3,8 - dihexyl - 5,6 - diamino - acenaphthene, 3,8 - diheptyl - 5,6 - diamino - acenaphthene, 3,8 - dioctyl - 5.6 - diamino - acenaphthene, 3,8 - dinonyl - 5,6-diamino-acenaphthene, 3,8 - didecyl - 5,6 - diamino - acenaphthene, 3,8-diundecyl-5,6-diamino-acenaphthene, 3,8-didodecyl-5,6-diamino-acenaphthene, etc., 4,7-dimethyl-5,6 - diamino - acenaphthene, 4,7-diethyl-5,6-diamino-acenaphthene, 4,7-dipropyl-5,6-diamino-acenaphthene, particularly 4,7-di-isopropyl-5,6-diamino-acenaphthene, 4,7-dibutyl-5,6-diamino-acenaphthene, particularly 4,7-di-tert-butyl-5,6-diamino-acenaphthene, 4,7-diamyl-5,6-diamino-acenaphthene, 4,7-dihexyl-5,6-diamino-acenaphthene, 4,7-diheptyl-5,6-diamino-acenaphthene, 4,7 - dioctyl-5,6-diamino-acenaphthene, 4,7 - dinonyl - 5,6 - diamino - acenaphthene, 4,7-didecyl-5,6-diamino-acenaphthene, 4,7-diundecyl-5,6-diamino-acenaphthene, 4,7-didodecyl-5,6-diamino-acenaphthene, etc., similarly substituted 5,6-dihydroxy-acenaphthenes, 5-hydroxy-6-amino-acenaphthenes and substituted acenaphthenes in which the amino and/or hydroxy groups are in different positions as hereinbefore set forth, and the alkyl groups are in positions not occupied by the amino and/or hydroxy groups. While the dialkyl substituted amino and/or hydroxy substituted acenaphthenes may be preferred, it is understood that a different number of alkyl substituents may be utilized and thus the inhibitor compound may contain 1, 3, 4, 5, 6, 7 or 8-alkyl substituents.

In another embodiment, substituent group or groups may be attached to one or more of the nitrogen atoms and the substituent groups may be the same or different. The substituents attached to the nitrogen atoms may be selected from those specifically hereinbefore set forth.

In still another embodiment, the inhibitor compounds may comprise acenaphthenes containing amino and/or hydroxy groups and also containing substituent groups in the one and/or two positions, with or without additional hydrocarbon substituents attached to the aryl rings, the substituents being selected from those hereinbefore set forth.

In some cases, the inhibitor compound may comprise an acenaphthylene substituted with amino and/or hydroxy groups and, when desired, other substituted groups as hereinbefore set forth in connection with the description of the amino and/or hydroxy substituted acenaphthenes.

It is understood that numerous compounds may be prepared and used in accordance with the present invention. However, all of these compounds will not necessarily be equivalent in all substrates. Therefore, the particular inhibitor compound to be used will depend upon the particular substrate being stabilized.

The inhibitor compound of the present invention may be prepared in any suitable manner. For example, 5,6-diamino-acenaphthene was prepared by nitrating acenaphthene to 5,6-dinitro-acenaphthene and reducing the dinitro compound to the corresponding diamino compound.

The inhibitor generally is added to the organic substance to be stabilized in an amount of less than about 1% by weight and preferably within a range of from about 0.0001% to about 1% by weight. The inhibitor may be used alone or in conjunction with inhibitor activators or synergists, dyes, antiknock agents, etc., depending upon the particular organic substrate being stabilized. For example, when used in gasoline, tetraethyl lead, a metal deactivator, a dye and perhaps an inhibitor activator, such as particular types of alkylene polyamines, may be used. On the other hand, when used in edible fats and oils, a synergist such as citric acid, phosphoric acid, ascorbic acid, etc., may be used along with the inhibitor.

The following examples are introduced to illustrate further the novelty and utility of the present invention, but not with the intention of unduly limiting the same.

*Example I*

The gasoline used in this example was a Mid-Continent thermally cracked gasoline which had a blank induction period of 45 minutes. 0.003% by weight of 5,6-diamino-acenaphthene was incorporated in another sample of the gasoline and this served to increase the induction period thereof to about 390 minutes.

*Example II*

0.006% by weight of 5,6-diamino-acenaphthene was added to another sample of the gasoline described in Example I and this served to increase the induction period thereof to about 545 minutes.

*Example III*

3,7-diamino-acenaphthene may be utilized to stabilize lard having a normal stability period of about four hours as determined by the active oxygen method. This method is a standard test for determining stability of lard and in general comprises bubbling air through a sample of the lard and periodically determining the peroxide number of the lard. The results are reported as the number of hours required to reach a peroxide number of 20. Upon the addition of 0.01% by weight of 3,7-diamino-acenaphthene, the stability period of the lard will be considerably increased.

*Example IV*

5-amino-6-hydroxy-acenaphthene may be incorporated in a concentration of 0.005% by weight, in cracked gasoline. This will serve to increase the induction period of the gasoline and thereby will retard oxidative deterioration thereof.

*Example V*

5,6-dihydroxy-acenaphthene may be added, in a concentration of 0.008% by weight, to cracked gasoline and will serve to retard oxidative deterioration thereof.

*Example VI*

4,7-ditertiary-butyl-5,6-diamino-acenaphthene may be incorporated, in a concentration of 0.006% by weight, to cracked gasoline and will serve to retard oxidative deterioration thereof.

*Example VII*

3,8-dihexyl-5,6-diamino-acenaphthene may be incorporated in a concentration of 0.01% by weight in paraffin wax to retard oxidative deterioration thereof.

*Example VIII*

3,8 - didodecyl - 5 - amino - 6 - hydroxy - acenaphthene may be utilized to prevent oxidative deterioration of rubber. 0.02% by weight of the inhibitor may be added to the latex resulting from the emulsion polymerization of butadiene and styrene, after which the latex is coagulated and dried. This will serve to retard deterioration of the rubber, and the rubber, therefore, will be improved as to color, strength, elasticity, etc.

I claim as my invention:
1. A method of stabilizing an organic substance against deterioration which comprises incorporating therein an inhibitor comprising a 5,6-diamino-acenaphthene.
2. An organic substance subject to deterioration in storage containing, as an inhibitor for said deterioration, a 5,6-diamino-acenaphthene.
3. Hydrocarbon distillate subject to deterioration in storage containing, as an inhibitor for said deterioration, a 5,6-diamino-acenaphthene.
4. Motor fuel tending to deteriorate in storage containing, as an inhibitor against said deterioration, from about 0.0001% to about 1% by weight of a 5,6-diamino-acenaphthene.
5. Cracked gasoline containing from about 0.0001% to about 1% by weight of 5,6-diamino-acenaphthene.
6. A fatty material subject to deterioration in storage containing, as an inhibitor therefor, a 5,6-diamino-acenaphthene.
7. Lard containing from about 0.001% to about 1% by weight of a 5,6-diamino-acenaphthene.
8. Rubber containing an inhibitor comprising a 5,6-diamino-acenaphthene.
9. Paraffin wax containing an inhibitor comprising a 5,6-diamino-acenaphthene.

References Cited in the file of this patent
UNITED STATES PATENTS

| | | |
|---|---|---|
| 1,884,885 | Sebrell | Oct. 25, 1932 |
| 2,228,667 | Martin | Jan. 14, 1941 |